Patented Aug. 8, 1950

2,518,397

UNITED STATES PATENT OFFICE 2,518,397

PROCESS FOR THE PRODUCTION OF ALIPHATIC NITRILES

William A. Stover, Woodbury, N. J., assignor to Socony-Vacuum Oil Company, Incorporated, a corporation of New York No Drawing. Application September 1, 1948, Serial No. 47,337

15 Claims. (Cl. 260—465.3)

This invention relates broadly to the preparation of nitriles, and is more particularly concerned with a process for producing aliphatic nitriles of relatively high molecular weight through the condensation of a paraffinic hydrocarbon having at least one tertiary carbon atom, with an unsaturated nitrile.

Aliphatic nitriles are organic compounds containing combined nitrogen. They are represented by the formula: $R-C \equiv N$, in which R is an alkyl, a cycloalkyl, an aryl, or an aralkyl group. The nitriles are very useful compounds, because they can be converted to other valuable products such as acids, amines, esters, etc.

As is well known to those familiar with the art, various processes for the preparation of nitriles have been proposed. Generally, however, these processes are disadvantageous from one or more aspects, namely, the toxic nature of the reactants used in their preparation and/or the relatively high cost of the reactants and/or the numerous steps involved. For example, aliphatic nitriles have been prepared by reacting alkyl halides with alkali cyanides. Another process has involved the oxidation of paraffinic hydrocarbons to acids, and then treating them with ammonia in the presence of a dehydrating agent, such as silica gel. Still other methods have involved reacting ketones with hydrocyanic acid in the presence of a dehydration catalyst, reacting olefins with hydrocyanic acid, etc.

It has now been discovered that nitriles having relatively high molecular weight may be readily prepared by a simple and inexpensive process involving the use of non-toxic reactants. It has now been found that nitriles of relatively high molecular weight may be obtained by condensing a hydrocarbon with an unsaturated nitrile in the presence, or absence, of a catalyst.

Accordingly, it is an object of the present invention to provide a method for producing nitriles of relatively high molecular weight. A further object is to provide a method for producing branched-chain aliphatic nitriles of relatively high molecular weight in the presence, or absence, of a catalyst. An important object is to provide nitriles of relatively high molecular weight by a process which is simple and inexpensive, and which involves the use of non-toxic reactants. Other objects will become apparent to those skilled in the art from the following detailed description.

Broadly stated, this invention provides a process for the preparation of nitriles of relatively high molecular weight, which comprises effecting the condensation of a hydrocarbon with an unsaturated nitrile, in the vapor phase, at elevated temperatures and pressures, and in the presence, or absence, of a condensation catalyst.

Hydrocarbons utilizable in the process of the present invention are the paraffinic, cycloparaffinic, and aromatic hydrocarbons. Especially preferred are those hydrocarbons which contain between about two and about twenty carbon atoms per molecule. Non-limiting examples of the paraffinic hydrocarbon reactant are ethane, propane, n-butane, isobutane, n-pentane, isopentane, neopentane, n-hexane, 2-methylpentane, 3-methylpentane, 2,2-dimethylbutane, 2,3-dimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, 2,2,3,3-tetramethylbutane, 2,2,3-trimethylpentane, 2,2,4-trimethylpentane, 2,3,3-trimethylpentane, 2,3,4-trimethylpentane, 2-methyl-3-ethylpentane, 2,3-dimethylhexane, 2,4-dimethylhexane, 2,5-dimethylhexane, 3,4-dimethylhexane, 3-ethylhexane, 2-methylheptane, 3-methylheptane, 4-methylheptane, n-nonane, 2-methyloctane, 2,4-dimethylheptane, 2,5-dimethylheptane, 2,6-dimethylheptane, 4-ethylheptane, 3-methyloctane, 4-methyloctane, n-decane, isodecane, 2,6-dimethyloctane, 2,7-dimethyloctane, n-undecane, n-dodecane, 2,4,5,7-tetramethyloctane, n-tridecane, n-tetradecane, isotetradecane, n-pentadecane, n-hexadecane, isohexadecane, n-heptadecane, n-octadecane, isooctadecane, n-nonadecane, n-eicosane and isoeicosane.

Paraffinic hydrocarbons having at least one tertiary carbon atom per molecule are especially preferred for the process of the present invention. Isobutane, isopentane, 2-methylpentane, 3-methylpentane, 2,3-dimethylbutane, 2-methylhexane, 3-methylhexane, 2,3-dimethylpentane, 2,4-dimethylpentane, 3-ethylpentane, 2,2,3-trimethylbutane, 2,2,3-trimethylpentane, 2,2,4-trimethylpentane, 2-methyl-3-ethylpentane, 2,3-dimethylhexane, 2,4-dimethylhexane, 2,5-dimethylhexane, 3,4-dimethylhexane, 3-ethylhexane, 2-methylheptane, 3-methylheptane, 4-methylheptane, 2-methyloctane, 3-methyloctane, 4-methyloctane, 2,4-dimethylheptane, 2,5-dimethylheptane, 2,6-dimethylheptane, isodecane, 2,6-dimethyloctane, 2,7-dimethyloctane, 2,4,5,7-tetramethyloctane, isotetradecane, isohexadecane, isooctadecane, and isoeicosane may be mentioned by way of non-limiting examples. The paraffinic hydrocarbons are readily obtainable from various sources, for example, from petroleum distillates, destructive distillation of vegetable substances, cracking of vegetable oils, natural gas, etc. These sources, particularly petroleum sources, provide ample supplies of relatively inexpensive paraffinic hydrocarbons.

Non-limiting examples of the cycloparaffinic hydrocarbons utilizable herein are cyclopentane, cyclohexane, methylcyclopentane, methylcyclohexane, o-dimethylcyclohexane, m-dimethylcyclohexane, p-dimethylcyclohexane, decylcyclohexane, and decaline. The aromatic hydrocarbon reactant may be, by way of non-limiting examples, benzene, toluene, o-xylene, m-xylene, p-xylene, naphthalene, anthracene, phenanthrene, 1,2,3-trimethylbenzene, 1,2,4-trimethylbenzene, 1,3,5-trimethylbenzene, ethylbenzene, o-diethylbenzene, m-diethylbenzene, p-diethylbenzene, isopropylbenzene, butylbenzene, t-butylbenzene, amylbenzene, isoamylbenzene, α-methylnaphthalene, β-methylnaphthalene, 1,4-dimethylnaphthalene, 2,3-dimethylnaphthalene, 2,6-dimethylnaphthalene, α-methylanthracene, β-methylanthracene, 1,3-dimethylanthracene, 2,3-dimethylanthracene, 2,6-dimethylanthracene, and 9-ethylanthracene. The cycloparaffinic hydrocarbons and aromatic hydrocarbons are readily available from many sources. They are obtained, primarily, from petroleum sources and from the products of coal tar distillation.

Generally speaking, any unsaturated aliphatic nitrile may be used in the process of this invention. Acrylonitrile, 3-butenenitrile, 4-pentenenitrile, etc., may be mentioned as non-limiting examples of the unsaturated aliphatic nitrile reactant. They contain one or more points of unsaturation at a carbon to carbon linkage, which imparts to the molecule the general chemical characteristics of an olefin. Such characteristics are somewhat influenced by the nitrile group, as exemplified by the ease of polymerization of a material like acrylonitrile. The unsaturated aliphatic nitriles are readily prepared by several well known methods and they are available commercially.

Condensation catalysts are not essential to the condensation reaction of this invention. However, it has been found advantageous to utilize homogeneous vapor phase, condensation catalysts, i. e., compounds that form with the paraffinic reactant and the unsaturated nitrile reactant, a single, homogeneous gaseous phase under the reaction conditions of temperature and pressure.

Catalysts suitable for this purpose are organic halogen compounds, such as, methyl chloroacetate, chloral, acetyl bromide, propylene bromide, isopropyl fluoride, trifluoroacetic acid, diiodoethyl ether, iodoform, p-dibromobenzene, benzyl iodide, benzoyl chloride, etc. Generally speaking, the preferred catalysts are the halogen derivatives of acyclic, alicyclic, and aromatic hydrocarbons, particularly the cheap and readily available low-boiling aliphatic hydrocarbons from methane to the hydrocarbons having about 10 carbon atoms per molecule. A feature of these catalysts, aside from their cheapness, is that very small amounts are necessary to produce a catalytic effect and, therefore, recovery is not essential. In practice, the catalyst is used in amounts varying between about 0.25% and about 2.5%, based on weight of the paraffinic hydrocarbon reactant in the charge. Larger amounts may be used if desired although no advantages appear to result therefrom.

The reactants, i. e., the paraffinic hydrocarbon and the unsaturated aliphatic nitrile, are reacted preferably in ratios greater than about 1:1, respectively. In general, it is desirable to maintain a molecular excess of paraffinic reactant over the unsaturated aliphatic nitrile. In practice, a proportion of about two to three moles of paraffinic hydrocarbon to about one mole of unsaturated aliphatic nitrile has been found to give good results.

The process should be carried out at a temperature falling within the range varying between about 500° F. and about 900° F., preferably, at a temperature falling within the range from about 650° F. to about 850° F.

The pressure to be employed should be at least about 500 pounds per square inch, and, preferably, in excess of about 2500 pounds per square inch. As will be apparent to those skilled in the art, time of reaction is dependent on the correlation of reaction temperature and pressure. As shown in the examples which will be set forth hereinafter for the purpose of illustrating the process of the present invention, satisfactory yields have been obtained with an average reaction time of 16.9 minutes at a temperature of about 850° F. and a pressure of about 4500 pounds per square inch.

The present process may be carried out by utilizing any of the well-known techniques for operating reactions in the vapor phase. The reaction zone may be a chamber of any suitable type useful in contact catalytic operations, through which the reactants, and catalyst, if used, may be passed at a predetermined temperature and pressure for a predetermined period of time. The system will comprise a condensing system through which the reaction product can pass into a receiver. It is to be understood that the catalyst will be removed from the reaction product by any suitable means, such as distillation, and that the desired aliphatic nitrile can be separated from unchanged paraffinic hydrocarbon and unchanged unsaturated aliphatic nitrile by distillation methods.

The process may be carried out as a batch, continuous, or semi-continuous type of operation. Particularly when operating on a commercial scale, the process is preferably carried out on a continuous basis for obvious economic considerations.

The following specific examples are for the purpose of illustrating the mode of preparing the aliphatic nitriles by the process of the present invention. It is to be clearly understood that the invention is not to be considered as limited to the specific paraffinic hydrocarbon reactant and unsaturated aliphatic nitrile reactant or to the specific catalyst or to the operations and manipulations described in the examples. As will be apparent to those skilled in the art, a wide variety of other reactants and catalysts as set forth hereinbefore may be used to prepare the aliphatic nitriles in accordance with this invention.

The runs described in the following examples were performed in a reactor comprising a coiled ¾-inch stainless steel tube having a capacity of 1600 cubic centimeters. The reactor was provided with a needle valve outlet through which the reaction products were released. The coil was immersed in a lead bath, heated to maintain a reaction temperature of about 850° F.

*Example I*

A mixture of 189 grams of acrylonitrile and 3480 grams of isobutane was charged continuously into the reactor, by displacement with ethylene glycol, under a pressure of 4500 pounds per square inch. The charging rate was controlled by regulating the pumping speeds so that the average contact time in the reactor was 16.9 minutes. The product, released from the reactor through the needle valve, was passed through a condenser into a receiver.

The crude product was stabilized and subjected to analytical distillation in a column of ten theoretical plates at a 10:1 reflux ratio. The product, weighing 250 grams (64 per cent of the theoretical yield based on the acrylonitrile charged), contained 132 grams (53 per cent of the product) of a substance having a boiling range of 160–178° C. The remaining product which was a solid appeared to be coke and polymer.

The fraction boiling at 160–178° C. was hydrolyzed with aqueous sodium hydroxide, and the resulting sodium salt was treated with concentrated hydrochloric acid. The resulting organic acid had a neutralization number (milligrams KOH per gram of acid) of 510. The theoretical neutralization number of a seven-carbon atom organic acid is 432.

The ester was prepared by alcoholysis of the nitrile product boiling at 160–178° C. and also by esterification of the acid having a neutralization number of 510. In both instances an ester boiling at 205–208° C. was obtained. The organic acid ester was reduced with hydrogen over a copper chromite catalyst at 250° C. to produce a product boiling at 161–164° C. This product possessed the properties of an alcohol which failed to give a definite product when an attempt was made to dehydrate it with bauxite.

The following example is given to demonstrate the desirable effect of a catalyst in the process of this invention.

*Example II*

A mixture of 548 grams of acrylonitrile, 80 grams of propylene bromide, and 15,528 grams of isobutane was charged in the same manner and in the same reactor as set forth in Example I. The same conditions of temperature and pressure were employed.

The crude product, weighing 684 grams (59 per cent of theoretical yield based on the acrylonitrile charged), contained 444 grams (65 per cent of the product) of a material boiling at 165–178° C.

A comparison of the results of Examples I and II, shows that the yield and quality of product are improved appreciably by the use of a catalyst in the reaction.

It will be apparent that the present invention discloses a process for preparing aliphatic nitriles having relatively high molecular weight which is simple and inexpensive, and which involves the use of non-toxic reactants. The reaction products, when isolated by distillation methods, are inexpensive and valuable organic intermediates useful, for example, in the preparation of carboxylic acids and their esters, and in the preparation of amines.

Although the present invention has been described in conjunction with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. A process for the preparation of aliphatic nitriles of relatively high molecular weight, which comprises contacting a paraffinic hydrocarbon having at least one tertiary carbon atom with an unsaturated aliphatic nitrile, in the vapor phase, in a reaction zone, at a temperature falling within the range varying from about 500° F. to about 900° F., and under a pressure of at least about 500 pounds per square inch.

2. A process for the preparation of aliphatic nitriles of relatively high molecular weight, which comprises contacting a paraffinic hydrocarbon having at least one tertiary carbon atom with an unsaturated aliphatic nitrile, in the vapor phase, in a reaction zone, maintaining a molecular excess of said paraffinic hydrocarbon over said unsaturated aliphatic nitrile in said reaction zone, at a temperature falling within the range varying from about 650° F. to about 850° F., and under a pressure of at least about 2500 pounds per square inch.

3. A process for the preparation of aliphatic nitriles of relatively high molecular weight, which comprises contacting a paraffinic hydrocarbon having at least one tertiary carbon atom with an unsaturated aliphatic nitrile, in the vapor phase, in a reaction zone, maintaining a proportion of at least about three moles of said paraffinic hydrocarbon to about one mole of said unsaturated aliphatic nitrile in said reaction zone, at a temperature falling within the range varying from about 650° F. to about 850° F., and under a pressure of at least about 2500 pounds per square inch.

4. A process for the preparation of aliphatic nitriles of relatively high molecular weight, which comprises contacting a paraffinic hydrocarbon having at least one tertiary carbon atom with an unsaturated aliphatic nitrile, in the vapor phase, in a reaction zone, at a temperature falling within the range varying from about 500° F. to about 900° F., under a pressure of at least about 500 pounds per square inch, and in the presence of a condensation catalyst consisting essentially of a material selected from the group consisting of acylic organic halogen compounds, alicyclic organic halogen compounds, and aromatic organic halogen compounds, that forms with said paraffinic hydrocarbon and said unsaturated aliphatic nitrile a single, homogeneous vapor phase in said reaction zone, in amounts of at least 0.5 per cent by weight based on the weight of said paraffinic hydrocarbon.

5. A process of claim 4 wherein the condensation catalyst consists essentially of a halogen derivative of a hydrocarbon.

6. A process of claim 4 wherein the condensation catalyst consists essentially of a halogen derivative of a low-boiling aliphatic hydrocarbon.

7. A process for the preparation of aliphatic nitriles of relatively high molecular weight, which comprises contacting a paraffinic hydrocarbon having at least one tertiary carbon atom with an unsaturated aliphatic nitrile, in the vapor phase, in a reaction zone, maintaining a molecular excess of said paraffinic hydrocarbon over said unsaturated aliphatic nitrile in said reaction zone, at a temperature falling within the range varying from about 500° F. to about 900° F., under a pressure of at least about 500 pounds per square inch, and in the presence of a condensation catalyst consisting essentially of a halogen derivative of a hydrocarbon that forms with said paraffinic hydrocarbon and said unsaturated aliphatic nitrile a single, homogeneous vapor phase in said reaction zone, in amounts of at least 0.5 per cent by weight based on the weight of said paraffinic hydrocarbon.

8. A process for the preparation of aliphatic nitriles of relatively high molecular weight, which comprises contacting a paraffinic hydrocarbon having at least one tertiary carbon atom with an unsaturated aliphatic nitrile, in the vapor phase, in a reaction zone, maintaining a proportion of at least about three moles of said paraffinic hydrocarbon to about one mole of said unsaturated aliphatic nitrile in said reaction zone, at a temperature falling within the range varying from about 650° F. to about 850° F., under a pressure of at least about 2500 pounds per square inch, and in the presence of a condensation catalyst consisting essentially of a halogen derivative of a low-boiling aliphatic hydrocarbon, that forms with said paraffinic hydrocarbon and said unsaturated aliphatic nitrile a single, homogenous vapor phase in said reaction zone, in amounts of at least 0.5 per cent by weight based on the weight of said paraffinic hydrocarbon.

9. A process for the preparation of aliphatic nitriles of relatively high molecular weight, which comprises contacting isobutane with acrylonitrile, in the vapor phase, in a reaction zone, at a temperature falling within the range varying from about 500° F. to about 900° F., and under a pressure of at least about 500 pounds per square inch.

10. A process for the preparation of aliphatic nitriles of relatively high molecular weight, which comprises contacting isobutane with acrylonitrile, in the vapor phase, in a reaction zone, maintaining a molecular excess of said isobutane over said acrylonitrile in said reaction zone, at a temperature falling within the range varying from about 650° F. to about 850° F., and under a pressure of at least about 2500 pounds per square inch.

11. A process for the preparation of aliphatic nitriles of relatively high molecular weight, which comprises contacting isobutane with acrylonitrile, in the vapor phase, in a reaction zone, maintaining a proportion of at least about three moles of said isobutane to about one mole of said acrylonitrile in said reaction zone, at a temperature falling within the range varying from about 650° F. to about 850° F., and under a pressure of at least about 2500 pounds per square inch.

12. A process for the preparation of aliphatic nitriles of relatively high molecular weight, which comprises contacting isobutane with acrylonitrile, in the vapor phase, in a reaction zone, at a temperature falling within the range varying from about 500° F. to about 900° F., under a pressure of at least about 500 pounds per square inch, and in the presence of a condensation catalyst consisting essentially of a material selected from the group consisting of acyclic organic halogen compounds, alicyclic organic halogen compounds, and aromatic organic halogen compounds, that forms with said isobutane and said acrylonitrile a single, homogeneous vapor phase in said reaction zone, in amounts of at least 0.5 per cent by weight based on the weight of said isobutane.

13. A process for the preparation of aliphatic nitriles of relatively high molecular weight, which comprises contacting isobutane with acrylonitrile, in the vapor phase, in a reaction zone, maintaining a molecular excess of said isobutane over said acrylonitrile in said reaction zone, at a temperature falling within the range varying from about 650° F. to about 850° F., under a pressure of at least about 2500 pounds per square inch, and in the presence of a condensation catalyst consisting essentially of a halogen derivative of a hydrocarbon, that forms with said isobutane and said acrylonitrile a single, a homogenous vapor phase in said reaction zone, in amounts of at least 0.5 per cent by weight based on the weight of said isobutane.

14. A process for the preparation of aliphatic nitriles of relatively high molecular weight, which comprises contacting isobutane with acrylonitrile, in the vapor phase, in a reaction zone, maintaining a proportion of at least about three moles of said isobutane to about one mole of said acrylonitrile in said reaction zone, at a temperature falling within the range varying from about 650° F. to about 850° F., under a pressure of at least about 2500 pounds per square inch, and in the presence of a condensation catalyst consisting essentially of a halogen derivative of a low-boiling aliphatic hydrocarbon, that forms with said isobutane and said acrylonitrile a single, homogeneous vapor phase in said reaction zone, in amounts of at least 0.5 per cent by weight based on the weight of said isobutane.

15. A process for the preparation of aliphatic nitriles of relatively high molecular weight, which comprises contacting isobutane with acrylonitrile, in the vapor phase, in a reaction zone, maintaining a molecular excess of said isobutane over said acrylonitrile in said reaction zone, at a temperature falling within the range varying from about 650° F. to about 850° F., under a pressure of at least about 2500 pounds per square inch, and in the presence of a condensation catalyst consisting essentially of propylene bromide that forms with said isobutane and said acrylonitrile a single, homogeneous vapor phase in said reaction zone, in amounts of at least 0.5 per cent by weight based on the weight of said isobutane.

WILLIAM A. STOVER.

REFERENCES CITED

The following references are of record in the file of this patent:

UNITED STATES PATENTS

| Number | Name | Date |
| --- | --- | --- |
| 2,017,537 | Hoffman et al. | Oct. 15, 1935 |
| 2,370,494 | Schmerling | Feb. 27, 1945 |
| 2,379,097 | Niederhauser et al. | June 26, 1945 |

OTHER REFERENCES

Hurd, "Pyrolysis of Carbon Compounds" (Chem. Catalog Co., 1929), pp. 125-126, 131.